United States Patent
Shen et al.

(10) Patent No.: US 10,943,160 B2
(45) Date of Patent: Mar. 9, 2021

(54) DYNAMIC GRAPHIC CODE IMPLEMENTATION METHOD AND APPARATUS

(71) Applicant: Advanced New Technologies Co. Ltd., Grand Cayman (KY)

(72) Inventors: Lingnan Shen, Hangzhou (CN); Jie Qi, Hangzhou (CN); Ge Chen, Hangzhou (CN); Huifeng Jin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/557,360

(22) Filed: Aug. 30, 2019

(65) Prior Publication Data

US 2019/0385033 A1 Dec. 19, 2019

Related U.S. Application Data

(63) Continuation of application No. PCT/CN2018/093792, filed on Jun. 29, 2018.

(30) Foreign Application Priority Data

Jul. 3, 2017 (CN) .......................... 201710533338.7

(51) Int. Cl.
*G06K 19/06* (2006.01)
(52) U.S. Cl.
CPC . *G06K 19/06028* (2013.01); *G06K 19/06037* (2013.01)

(58) Field of Classification Search
CPC ............. G06K 19/06; G06K 19/06009; G06K 19/06018; G06K 19/06028; G06K 19/06037; G06K 19/06112; G06K 7/10; G06Q 20/3274
See application file for complete search history.

(56) References Cited

U.S. PATENT DOCUMENTS

| | | | | |
|---|---|---|---|---|
| 9,607,257 | B2 * | 3/2017 | Cha ................. | G06K 19/06112 |
| 9,672,458 | B2 * | 6/2017 | Burkhart .......... | G06K 19/06037 |
| 9,734,497 | B2 * | 8/2017 | Li ......................... | G06Q 10/04 |
| 9,881,297 | B2 * | 1/2018 | Kranzley ............... | G06Q 40/00 |

(Continued)

FOREIGN PATENT DOCUMENTS

| CN | 103218965 A | 7/2013 |
|---|---|---|
| CN | 103729765 A | 4/2014 |

(Continued)

OTHER PUBLICATIONS

International Search Report of PCT Application No. PCT/CN2018/093792, dated Sep. 27, 2018, issued by the ISA/CN—State Intellectual Property Office of the P.R. China.

(Continued)

*Primary Examiner* — Thien M Le
*Assistant Examiner* — April A Taylor
(74) *Attorney, Agent, or Firm* — Finnegan, Henderson, Farabow, Garrett & Dunner, L.L.P.

(57) ABSTRACT

The specification discloses a dynamic graphic code implementation method and apparatus. The method includes: invoking a distance sensor to detect a distance between a device and a blocking object when displaying a graphic code; and if the distance is within a preset distance range, stopping refreshing the graphic code.

9 Claims, 3 Drawing Sheets

(56) References Cited

U.S. PATENT DOCUMENTS

| | | | |
|---|---|---|---|
| 10,586,430 B2* | 3/2020 | Khliust | G06Q 20/3274 |
| 2010/0125509 A1 | 5/2010 | Kranzley et al. | |
| 2012/0067943 A1* | 3/2012 | Saunders | G06K 7/1095 |
| | | | 235/375 |
| 2013/0105575 A1* | 5/2013 | Kobres | G07B 15/00 |
| | | | 235/382 |
| 2013/0281163 A1 | 10/2013 | Lockwood | |
| 2016/0027017 A1 | 1/2016 | Chitragar | |
| 2016/0196548 A1 | 7/2016 | Kwak | |
| 2017/0243040 A1* | 8/2017 | Burkhart | G06K 19/06037 |

FOREIGN PATENT DOCUMENTS

| | | |
|---|---|---|
| CN | 106896994 A | 6/2017 |
| CN | 103258265 A | 8/2017 |
| CN | 107451501 A | 12/2017 |

OTHER PUBLICATIONS

Written Opinion of the International Searching Authority of PCT Application No. PCT/CN2018/093792, dated Sep. 27, 2018, issued by the ISA/CN—State Intellectual Property Office of the P.R. China.
Extended European Search Report for Application No. 18828672.8, dated Apr. 1 2020.

* cited by examiner

DYNAMIC GRAPHIC CODE IMPLEMENTATION METHOD AND APPARATUS

CROSS-REFERENCE TO RELATED APPLICATIONS

This application is a continuation application of International Application No. PCT/CN2018/093792, filed on Jun. 29, 2018, which is based upon and claims priority to Chinese Patent Application No. 201710533338.7, filed on Jul. 3, 2017, the entire content of all of which is incorporated herein by reference.

TECHNICAL FIELD

The specification relates to the field of Internet technologies, and in particular, to a dynamic graphic code implementation method and apparatus.

TECHNICAL BACKGROUND

A graphic code, such as a bar code or a QR code, is an information carrier, and is a graphic identifier generated by processing, such as coding, information according to a certain rule.

To ensure that private information carried in the graphic code is not stolen, it is necessary to provide a more reliable and secure graphic code implementation scheme.

SUMMARY

In view of the above, the specification provides a dynamic graphic code implementation method and apparatus.

Specifically, the specification is achieved by the following technical solutions:

A dynamic graphic code implementation method, comprises: invoking a distance sensor to detect a distance between a device and a blocking object when displaying a graphic code; and if the distance is within a preset distance range, stopping refreshing the graphic code.

A dynamic graphic code implementation apparatus, comprises: a distance detecting unit configured to invoke a distance sensor to detect a distance between a device and a blocking object when displaying a graphic code; and a refresh stopping unit configured to stop refreshing the graphic code if the distance is within a preset distance range.

A dynamic graphic code implementation apparatus, comprises: a processor; and a memory configured to store a machine executable instruction; wherein by reading and executing the machine executable instruction stored in the memory, the processor is caused to: invoke a distance sensor to detect a distance between a device and a blocking object when displaying a graphic code; and if the distance is within a preset distance range, stop refreshing the graphic code.

A non-transitory computer-readable storage medium has stored therein instructions that, when executed by a processor of a device, cause the device to perform a dynamic graphic code implementation method, the method comprising: invoking a distance sensor to detect a distance between a device and a blocking object when displaying a graphic code; and if the distance is within a preset distance range, stopping refreshing the graphic code.

As can be seen from the above description, the technical solutions can invoke a distance sensor to detect a distance between a device and a blocking object when displaying a graphic code, and stop refreshing the graphic code if the distance is within a preset distance range, which avoids the security risk caused by the case that a code scanning device scans two graphic codes before and after refreshing, thereby improving the reliability and security of the dynamic graphic code.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION OF THE EMBODIMENTS

Example embodiments will be described in de herein, examples of which are illustrated in the accompanying drawings. The following description refers to the accompanying drawings in which the same numeral in different drawings refers to the same or similar elements, unless otherwise indicated. The implementations described in the following example embodiments do not represent all implementations consistent with the specification. Instead, the implementations are merely examples of apparatuses and methods consistent with what are described in detail in the appended claims and some aspects of the specification.

The terms used in the specification are merely intended to describe particular embodiments, and are not intended to limit the specification. The singular forms "a" and "the" used in the specification and the appended claims are also intended to include plural forms, unless other meanings are clearly indicated in the context. It should also be understood that the term "and/or" as used herein refers to and encompasses any or all possible combinations of one or more associated listed items.

It should be understood that although the terms, first, second, third, etc. may be used in the specification to describe various information, such information should not be limited to these terms. These terms are only used to distinguish the same type of information from each other. For example, the first information may also be referred to as the second information without departing from the scope of the specification. Similarly, the second information may also be referred to as the first information. Depending on the context, the word "if" as used herein may be interpreted as "at the time of" or "when" or "in response to determination."

In this embodiment, in addition to specified information, a dynamic graphic code generally carries a time factor, such as a timestamp of the time when the dynamic graphic code is generated. A graphic code generating device can generate graphic codes carrying different time factors for the specified information with the change of time, and a graphic code analyzing device can determine whether the graphic code is reliable according to the time factor, thereby improving the security of the graphic code and reducing the risk of information leakage.

Figure 1:
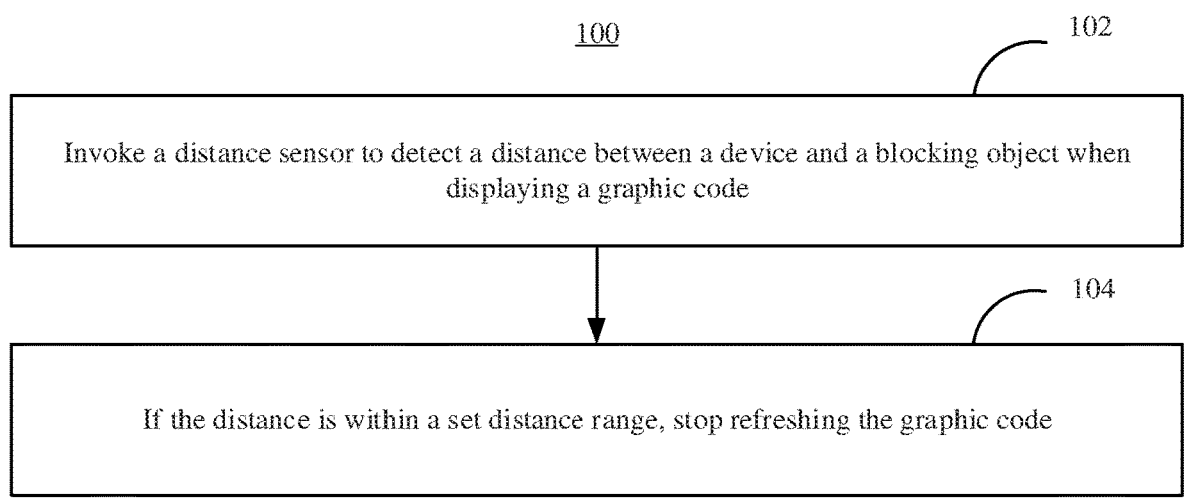
FIG. 1 is a flow chart of a dynamic graphic code implementation method, according to an example embodiment.

FIG. 1 is a flow chart of a dynamic graphic code implementation method 100, according to an example embodiment.

Referring to FIG. 1, the dynamic graphic code implementation method 100 can be applied to a client that displays a graphic code. The client is generally installed in an electronic device such as a mobile phone or a tablet computer. The dynamic graphic code implementation method 100 can include the following steps:

In step 102, a distance sensor is invoked to detect a distance between a device and a blocking object when a graphic code is displayed.

In this embodiment, the display of the graphic code can be triggered by a user. For example, in offline electronic payment, the user opens a payment graphic code, and in riding a bus, the user opens a riding graphic code. The payment graphic code and the riding graphic code are generally dynamic graphic codes, which can be updated over time. In this embodiment, the distance sensor of the device can be invoked to detect the distance between the device and the blocking object when the graphic code is displayed. For example, the device is a mobile phone, and the distance sensor is generally located in the vicinity of a receiver of the mobile phone. The positions of distance sensors of different devices may be different.

In this embodiment, after the graphic code is displayed, a code scanning operation is generally performed, and the blocking object is generally a code scanning device, such as a barcode scanner and a terminal device having a code scanning function. The blocking object may also be other objects, such as a user's finger or other objects, and is not limited in this embodiment.

In step 104, if the distance is within a set distance range, refreshing the graphic code is stopped.

Based on step 102, when the graphic code is displayed, if it is detected that the distance between the device and the blocking object is within the set distance range, it is indicated that the probability that the code scanning operation is currently being performed is high, and the refreshing of the graphic code can be stopped, so as to avoid the security risk caused by the refreshing of the graphic code in the code scanning process, for example, the code scanning device scans two graphic codes before and after refreshing, and then two payment requests are initiated.

The distance range is generally a range of distance from the device, e.g., the mobile phone, when the code scanning device can successfully scan the graphic code displayed on the mobile phone, which can be preset by a developer, for example, 0 cm-5 cm, and 0 cm-10 cm, etc.

In this embodiment, in a client refresh mode, stopping refreshing the graphic code may include: not generating, e.g., refraining from generating, a new graphic code when a refresh time of the graphic code arrives. The client refresh mode refers to the generation of graphic code by a client.

For example, the graphic code is a payment QR code, it is assumed that the refresh period of the payment QR code is 1 minute, the blocking object is a code scanning device. After the payment QR code is displayed, if the refresh mode is the client refresh mode, the client can generate a new payment QR code according to the user's account information and a time factor every minute, and refresh the currently displayed payment QR code with the newly generated payment QR code. It is also assumed that the client displays the payment QR code at 16:22:02, the next refresh time of the payment QR code is 16:23:02. If it is detected at 16:22:58 that the distance between the mobile phone and the code scanning device is within the set distance range, the client does not generate a new payment QR code at 16:23:02.

In this embodiment, in a server refresh mode, stopping refreshing the graphic code may include: not sending, e.g., refraining from sending, a refresh request to the server when the refresh time of the graphic code arrives. The server refresh mode refers to the generation of graphic code by the server. For example, when the graphic code is displayed or refreshed, the client sends a request to the server, and the server generates a graphic code and then sends it to the client.

For example, the graphic code is a payment QR code, the refresh period of the payment QR code is 1 minute, and the blocking object is a code scanning device. After the payment QR code is displayed, if the refresh mode is the server refresh mode, the client can send a refresh request to the server every minute, and the server generates a new payment QR code according to the user's account information and the time factor, and sends the newly generated QR code to the client for the client to refresh. It is also assumed that the client displays the payment QR code at 16:22:02, the next refresh time of the payment QR code is 16:23:02. If it is detected at 16:22:58 that the distance between the mobile phone and the code scanning device is within the set distance range, the client does not send a fresh request to the server at 16:23:02.

As can be seen from the above description, this embodiment can invoke a distance sensor to detect the distance between a device and a blocking object when displaying a graphic code, and stop refreshing the graphic code if the distance is within a set distance range, which avoids the security risk caused by the case that the code scanning device scans two graphic codes before and after refreshing, thereby improving the reliability and security of the dynamic graphic code.

In an embodiment, the refreshing of the graphic code can be restored if it is detected that the distance between the device and the blocking object is not within the distance range after stopping refreshing the graphic code.

For example, the graphic code is a payment QR code, the refresh period of the payment QR code is 1 minute, and the blocking object is a code scanning device. It is assumed that the set distance range is 0 cm-5 cm, and the client displays the payment QR code at 16:22:02. If it is detected at 16:22:58 that the distance between the mobile phone and the code scanning device is 4.5 cm, the refreshing of the payment QR code can be stopped, for example, at the next refresh time 1.6:23:02, the client does not generate a new payment QR code. It is also assumed that at 16:23:15, the distance between the mobile phone and the code scanning device is detected to be 15 cm, which is not within the distance range. If the payment QR code is still displayed at the moment, the refreshing of the payment QR code can be restored.

In an embodiment, the implementation for restoring the refreshing of the payment QR code may be: refreshing the payment QR code when it is detected that the distance between the mobile phone and the code scanning device is not within the distance range, for example, a new payment QR code is generated according to the current tin p and the user account for refreshing. Still taking the above example as an example, the payment QR code can be refreshed at 16:23:15, After the payment QR code is refreshed, the next refresh time can be based on the time 16:22:02 when the payment QR code is displayed, for example, 16:24:0:2, or based on the refresh time 16:23:15 after the restoring, for example, 16:24:15, which is not limited in this embodiment.

In another embodiment, the implementation for restoring the refresh of the payment QR code may also be: refreshing the payment QR code when the next refresh retime arrives. Still taking the above example as an example, at 16:23:15, the distance between the mobile phone and the code scanning device is detected to be 15 cm, and the refresh of the payment QR code can be made at the next refresh time 16:24:02 of the payment QR code.

The refreshing of the payment QR code may also be restored in other ways, which is not limited in this embodiment.

In an embodiment, after the refreshing of the graphic code is stopped, the refreshing of the graphic code can be restored when a time duration since the refreshing of the graphic code is stopped reaches a set time duration. The set time duration is generally a time duration required for successful scanning, and can also be set by a developer, such as 5 s and 10 s.

For example, the graphic code is a payment QR code, the refresh period of the payment QR code is 1 minute, and the blocking object is a code scanning device. It is assumed that the set time duration is 10 s, and the client displays the payment QR code at 16:22:02. If the refreshing of the payment QR code is stopped at 16:22:58, the refreshing of the payment QR code can be restored at 16:23:08. For the implementation for restoring the refreshing of the payment QR code, reference can be made to the foregoing description.

Corresponding to the embodiments of the foregoing dynamic graphic code implementation method, the specification also provides embodiments of a dynamic graphic code implementation apparatus.

Figure 2:
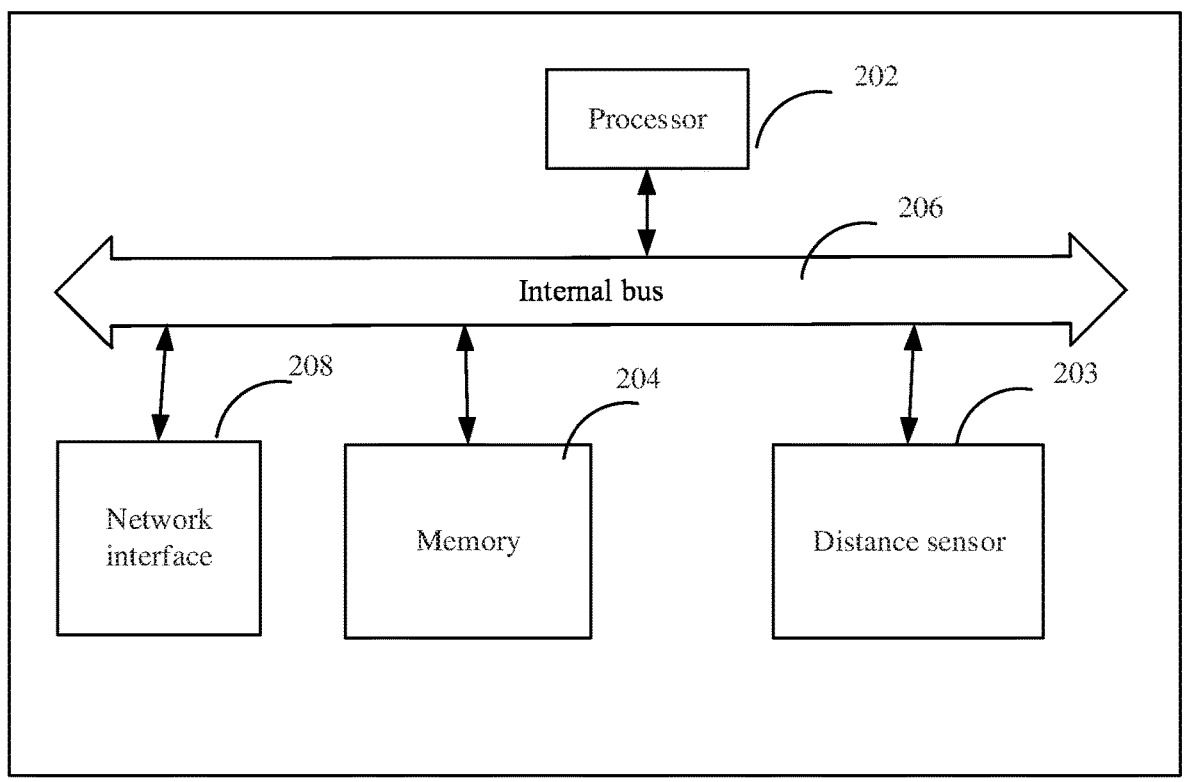
FIG. 2 is a schematic diagram of a dynamic graphic code implementation apparatus, according to an example embodiment.

FIG. 2 is a schematic diagram of a dynamic graphic code implementation apparatus 200, according to an example embodiment. Referring to FIG. 2, the dynamic graphic code implementation apparatus 200 includes a processor 202, a distance sensor 203, and a memory 204 configured to store machine executable instructions. The processor 202 and the memory 204 may be connected to each other by an internal bus 206. The dynamic graphic code implementation apparatus 200 may also include a network interface 208 to enable communication with other devices or components. The dynamic graphic code implementation apparatus 200 may perform the above described methods.

The processor 202 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

The memory 204 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Figure 3:
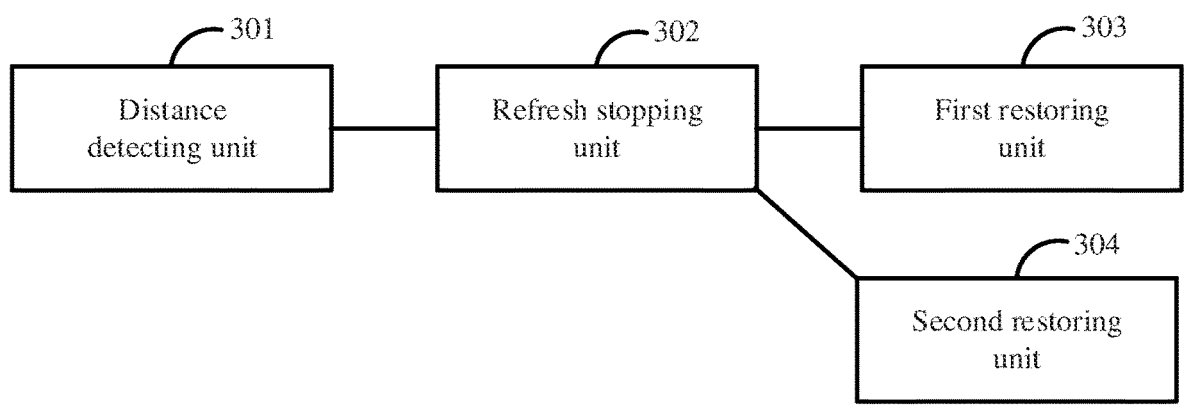
FIG. 3 is a block diagram of a dynamic graphic code implementation apparatus, according to an example embodiment.

FIG. 3 is a block diagram of a dynamic graphic code implementation apparatus 300, according to an example embodiment.

Referring to FIG. 3, the dynamic graphic code implementation apparatus 300 can include a distance detecting unit 301, a refresh stopping unit 302, a first restoring unit 303, and a second restoring unit 304.

The distance detecting unit 301 is configured to invoke a distance sensor to detect the distance between a device and a blocking object when displaying a graphic code;

The refresh stopping unit 302 is configured to stop refreshing the graphic code if the distance is within a set distance range.

The first restoring unit 303 is configured to restore the refreshing of the graphic code if it is detected that the distance between the device and the blocking object is not within the distance range after stopping refreshing the graphic code.

The second restoring unit 304 is configured to restore the refreshing of the graphic code when a time duration since the refreshing of the graphic code is stopped reaches a set time duration.

In an embodiment, the restoring the refreshing of the graphic code by the first restoring unit 303 or the second restoring unit 304 includes: the graphic code is refreshed when the next refresh time arrives.

In an embodiment, the refresh stopping unit 302 is configured to not send, e.g., refrain from send, a refresh request to a server when the refresh time of the graphic code arrives in a server refresh mode.

Each of the above described units may be implemented as software, or hardware, or a combination of software and hardware. For example, each of the above described units may be implemented using a processor executing instructions stored in a memory. Also, for example, each the above described units may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods.

For details of the implementation process of the functions and effects of units in the foregoing apparatus, reference can be made to the implementation process of the corresponding steps in the foregoing method.

Since the apparatus embodiments basically correspond to the method embodiments, reference can be made to the partial description of the method embodiments for relevant contents. The apparatus embodiments described above are merely illustrative, where the units described as separate components may or may not be physically separated, and the components displayed as units may or may not be physical units, that is, may be located at the same position, also be distributed to multiple network units. Some or all of the units can be selected according to actual requirements to achieve the objective of the scheme of the specification. A person of ordinary skill in the art can understand and implement the above without involving any inventive effort.

The apparatuses or units illustrated in the above embodiments may be implemented by computer chips or entities, or implemented by a product having a certain function. A typical implementation device is a computer, and the specific form of the computer may be a personal computer, a laptop computer, a cellular phone, a camera phone, a smart phone, a personal digital assistant, a media player, a navigation device, an email transceiver, a game console, a tablet computer, a wearable device, or any combination of these devices.

In the embodiment illustrated in FIG. 2, by reading and executing the machine executable instruction stored in the memory 204, which may correspond to a dynamic graphic code implementation control logic, the processor 202 is caused to: invoke a distance sensor to detect the distance between a device and a blocking object when displaying a graphic code; and if the distance is within a set distance range, stop refreshing the graphic code.

In an embodiment, by reading and executing the machine executable instruction stored in the memory 204, which may correspond to the dynamic graphic code implementation control logic, the processor 202 is further caused to: restore the refresh of the graphic code if it is detected that the distance between the device and the blocking object is not within the distance range after stopping refreshing the graphic code.

In an embodiment, by reading and executing the machine executable instruction stored in the memory 204, which may correspond to the dynamic graphic code implementation control logic, the processor 202 is further caused to: restore the refresh of the graphic code when a time duration since the refreshing of the graphic code is stopped reaches a set time duration.

In an embodiment, when the refresh of the graphic code is restored, the processor 202 is caused to: refresh the graphic code when the next refresh time arrives.

In an embodiment, when the refreshing of the graphic code is stopped, the processor 202 is caused to: not send, e.g., refrain from send, a refresh request to a server when the refresh time of the graphic code arrives in a server refresh mode.

Corresponding to the foregoing embodiment of the dynamic graphic code implementation method as shown in FIG. 1, the specification also provides a computer-readable storage medium having a computer program stored thereon, and when the program is executed by a processor, the following steps are implemented: a distance sensor is invoked to detect the distance between a device and a blocking object when displaying a graphic code; and if the distance is within a set distance range, the refreshing of the graphic code is stopped.

In an embodiment, the following step is further included: the refreshing of the graphic code is restored if it is detected that the distance between the device and the blocking object is not within the distance range after stopping refreshing the graphic code.

In an embodiment, the following step is further included: the refreshing of the graphic code is restored when a time duration since the refreshing of the graphic code is stopped reaches a set time duration.

In an embodiment, the restoring the refreshing of the graphic code includes: the graphic code is refreshed when the next refresh time arrives.

In an embodiment, the stopping the refreshing of the graphic code includes: a refresh request is not sent to a server when the refresh time of the graphic code arrives in a server refresh mode.

The above describes the specific embodiments of the specification. Other embodiments are within the scope of the appended claims. In some cases, the actions or steps recited in the claims can be performed in a different order than the embodiments and can still achieve the desired results. In addition, the processes depicted in the drawings are not necessarily in a particular order or in a sequential order to achieve the desired results. In some embodiments, multi-task processing and parallel processing are also possible or may be advantageous.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A dynamic graphic code implementation method, comprising:
    invoking a distance sensor of a device to detect a distance between the device and a blocking object when displaying a graphic code on the device, wherein refreshing the graphic code is scheduled for a first refresh time;
    if the distance between the device and the blocking object is within a preset distance range, stopping refreshing the graphic code scheduled for the first refresh time; and
    after stopping refreshing the graphic code, if it is detected that the distance between the device and the blocking object is not within the preset distance range, restoring the refreshing of the graphic code when a next refresh time for refreshing the graphic code arrives.

2. The method according to claim 1, further comprising:
    restoring the refreshing of the graphic code when a time duration since the refreshing of the graphic code is stopped reaches a preset time duration.

3. The method according to claim 1, wherein the restoring the refreshing of the graphic code comprises:
    refreshing the graphic code when the next refresh time arrives, the next refresh time being one of the first refresh time and a second refresh time.

4. The method according to claim 1, wherein the stopping refreshing the graphic code comprises:
    in a preset refresh mode, when the first refresh time of the graphic code arrives, not sending a refresh request.

5. An apparatus for dynamic graphic code implementation, comprising:
    a processor; and
    a memory configured to store a machine executable instruction;
    wherein by executing the machine executable instruction stored in the memory, the processor is caused to:
    invoke a distance sensor of the apparatus to detect a distance between the apparatus and a blocking object when displaying a graphic code on the apparatus, wherein refreshing the graphic code is scheduled for a first refresh time;
    stop refreshing the graphic code scheduled for the first refresh time, if the distance between the apparatus and the blocking object is within a preset distance range; and
    after stopping refreshing the graphic code, if it is detected that the distance between the apparatus and the blocking object is not within the preset distance range, restore the refreshing of the graphic code when a next refresh time for refreshing the graphic code arrives.

6. The apparatus according to claim 5, wherein the processor is further caused to:
    restore the refreshing of the graphic code when a time duration since the refreshing of the graphic code is stopped reaches a preset time duration.

7. The apparatus according to claim 5, wherein in restoring the refreshing of the graphic code, the processor is further caused to:
    refresh the graphic code when the next refresh time arrives, the next refresh time being one of the first refresh time and a second refresh time.

8. The apparatus according to claim 5, wherein the processor is further caused to:

in a preset refresh mode, not send a refresh request when the first refresh time of the graphic code arrives.

9. A non-transitory computer-readable storage medium having stored therein instructions that, when executed by a processor of a device, cause the device to perform a dynamic graphic code implementation method, the method comprising:

invoking a distance sensor of the device to detect a distance between the device and a blocking object when displaying a graphic code on the device, wherein refreshing the graphic code is scheduled for a first refresh time;

if the distance between the device and the blocking object is within a preset distance range, stopping refreshing the graphic code scheduled for the first refresh time; and after stopping refreshing the graphic code, if it is detected that the distance between the device and the blocking object is not within the preset distance range, restoring the refreshing of the graphic code when a next refresh time for refreshing the graphic code arrives.

\* \* \* \* \*